(12) United States Patent
Dhar et al.

(10) Patent No.: US 10,318,686 B2
(45) Date of Patent: Jun. 11, 2019

(54) METHODS FOR REDUCING DELAY ON INTEGRATED CIRCUITS BY IDENTIFYING CANDIDATE PLACEMENT LOCATIONS IN A LEVELED GRAPH

(71) Applicant: Intel Corporation, Santa Clara, CA (US)

(72) Inventors: Shounak Dhar, Austin, TX (US); Mahesh A. Iyer, Fremont, CA (US); Love Singhal, San Jose, CA (US); Nikolay Rubanov, Morgan Hill, CA (US); Saurabh Adya, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 98 days.

(21) Appl. No.: 15/391,511

(22) Filed: Dec. 27, 2016

(65) Prior Publication Data

US 2018/0101624 A1 Apr. 12, 2018

Related U.S. Application Data

(60) Provisional application No. 62/406,877, filed on Oct. 11, 2016.

(51) Int. Cl.
 *G06F 17/50* (2006.01)
(52) U.S. Cl.
 CPC ........ *G06F 17/505* (2013.01); *G06F 17/5031* (2013.01); *G06F 17/5054* (2013.01); *G06F 17/5072* (2013.01); *G06F 2217/84* (2013.01)

(58) Field of Classification Search
 CPC ............... G06F 17/5031; G06F 17/505; G06F 17/5054; G06F 17/5072; G06F 2217/84
 See application file for complete search history.

(56) References Cited

U.S. PATENT DOCUMENTS

| | | | |
|---|---|---|---|
| 5,508,937 A | 4/1996 | Abato et al. | |
| 6,295,517 B1 | 9/2001 | Roy et al. | |
| 6,321,369 B1 * | 11/2001 | Heile ................ | G01R 31/3177 716/102 |
| 6,334,205 B1 | 12/2001 | Iyer et al. | |

(Continued)

*Primary Examiner* — Helen Rossoshek
(74) *Attorney, Agent, or Firm* — Treyz Law Group, P.C.; Jason Tsai

(57) ABSTRACT

Configuration data for an integrated circuit may be generated using logic design equipment to implement an circuit design on the integrated circuit. Implementing the circuit design may include placing functional blocks at optimal locations that increase the maximum operating frequency of the integrated circuit implementing the optimal circuit design. Logic design equipment may perform timing analysis on an initially placed circuit design that includes initially placed functional blocks. The timing analysis may identify one or more critical paths that may be shortened by moving the critical functional blocks within the circuit design to candidate placement locations. A levelized graph representing possible candidate locations and paths between the possible candidate locations may be traversed in a breadth-first search to generate a shortest updated critical path. The critical functional blocks may be moved to candidate locations corresponding to the updated critical path. The process of shortening critical paths may be iteratively performed.

15 Claims, 11 Drawing Sheets

(56) References Cited

U.S. PATENT DOCUMENTS

| | | | |
|---|---|---|---|
| 6,721,926 B2 | 4/2004 | Wang et al. | |
| 7,219,048 B1* | 5/2007 | Xu | G06F 17/5031 703/19 |
| 7,284,228 B1* | 10/2007 | Haratsaris | G06F 17/5009 716/117 |
| 7,437,697 B2 | 10/2008 | Venkateswaran et al. | |
| 7,861,190 B1* | 12/2010 | Kretchmer | G06F 17/5072 716/121 |
| 8,589,846 B2 | 11/2013 | Mottaez et al. | |
| 8,595,671 B2* | 11/2013 | He | G06F 17/5054 716/116 |
| 8,990,740 B2* | 3/2015 | Zhang | B82Y 10/00 326/41 |
| 2002/0166104 A1* | 11/2002 | Wu | G06F 17/505 716/103 |
| 2003/0105617 A1 | 6/2003 | Cadambi et al. | |
| 2008/0028347 A1 | 1/2008 | Hiraoglu et al. | |
| 2018/0165400 A1* | 6/2018 | Feld | G06F 17/5054 |

* cited by examiner

METHODS FOR REDUCING DELAY ON INTEGRATED CIRCUITS BY IDENTIFYING CANDIDATE PLACEMENT LOCATIONS IN A LEVELED GRAPH

This application claims the benefit of provisional patent application No. 62/406,877, filed Oct. 11, 2016, which is hereby incorporated by reference herein in its entirety.

BACKGROUND

This relates to integrated circuits and more particularly, to systems for designing logic circuitry on integrated circuit devices such as programmable integrated circuits.

Programmable integrated circuits are a type of integrated circuit that can be programmed by a user to implement a desired custom logic function. In a typical scenario, a logic designer uses computer-aided design tools to design a custom logic circuit that performs custom logic functions. When the design process is complete, the computer-aided design tools generate configuration data. The configuration data is loaded into memory elements to configure the devices to perform the functions of the custom logic circuit. Memory elements are often formed using random-access-memory (RAM) cells. Because the RAM cells are loaded with configuration data during device programming, the RAM cells are sometimes referred to as configuration memory or configuration random-access-memory cells (CRAM).

Integrated circuits such as programmable integrated circuits often include millions of gates and megabits of embedded memory. The complexity of a large system requires the use of electronic design automation (EDA) tools to create and optimize a logic design for the system onto an integrated circuit (target device). The tools may perform logic synthesis operations to generate a gate-level description of the logic design for implementation on a target programmable logic device. Logic synthesis also performs technology mapping to map the gates onto logic elements (resources) that are available on the target programmable logic device. Functional blocks of logic elements are then physically placed and routed onto the target programmable device, while concurrently optimizing for timing, area, wiring, routing congestion, and power.

In practice, it is desirable for functional blocks of logic elements to be placed an the target programmable device with low operational latency or high operating frequency. It is within this context that the embodiments herein arise.

SUMMARY

It is appreciated that the present invention can be implemented in numerous ways, such as a process, an apparatus, a system, a device, or a method on a computer readable medium. Several inventive embodiments of the present invention are described below.

An integrated circuit may include memory elements arranged in rows and columns. The integrated circuit may be a programmable integrated circuit that can be programmed (e.g., using configuration data) by a user to implement desired custom logic functions (logic designs or systems). The configuration data may be generated using a logic design system (e.g., logic design computing equipment). When a target device such as a programmable integrated circuit is loaded with the configuration data, the target device may be programmed to implement the logic design identified by the configuration data.

The logic design equipment may initially place a plurality of functional blocks in the circuit design at a plurality of initial placement locations.

By performing timing analysis on the initially placed circuit design, the logic design equipment may identify a critical path linking the plurality of functional blocks and candidate placement locations for each of the plurality of functional blocks. The critical path may be identified by evaluating an amount of delay slack for each interconnection (e.g., for each two-pin net or functional block pair) in the circuit design. The critical path may have a cumulative amount of delay slack that is below a predetermined slack threshold. Candidate placement locations may either be occupied by an existing functional block or unoccupied. As an example, a particular one of the plurality of functional blocks may move to an unoccupied candidate location. As another example, the particular one of the plurality of functional blocks may swap locations with an occupied candidate location instead of moving to the occupied candidate location.

Additional functional blocks may form connections with, the plurality of functional blocks using side paths. In other words, side paths (e.g., non-critical paths) may be connected to the plurality of functional blocks in addition to the critical path. The logic design equipment may compute hard delay limits for the side paths that places constraints on the path lengths of the side paths. The hard delay limits may be optionally relaxed to increase a number of the candidate locations and increase the number of possible placement options for the plurality of functional blocks when reducing delay for the critical path.

A given functional block may be optionally moved closer to either one of the plurality of functional blocks or one of the candidate placement locations of the one of the plurality of functional blocks to improve placement optimization operations (e.g., to increase the number of the candidate locations available to the plurality of functional blocks). For example, the first given functional blocks may be connected to the plurality of functional blocks, in which scenario, the given functional block may move closer to the plurality of functional blocks.

As another example, the given functional block may be connected to a candidate placement location for the one of the plurality of functional blocks, in which scenario the given functional block may move closer to the candidate placement location of the one of the plurality of functional blocks. Side paths that couple the given functional block to the candidate location may have a computed hard delay limit. If moving the one of the plurality of functional blocks to the candidate placement location violates the computed hard delay limit, the candidate placement location may be eliminated as a candidate location.

A levelized graph (e.g., a graph with multiple levels may be generated to represent possible paths linking the candidate placement locations for a first functional block in the plurality of functional blocks to the candidate placement locations for a second functional block in the plurality of functional blocks. The levelized graph may have a starting level (e.g., a level in which a beginning point of the critical path lies) and an ending level (e.g., a level in which an end point of the critical path lies). The levelized graph may also include two consecutive levels, in which the same candidate placement location is located. A path between the same candidate placement location and itself in the two consecutive levels may be eliminated.

The levelized graph may then be analyzed (e.g., traversed through a breadth-first search) to identify an updated critical path (e.g., a new path with shorter path length, a new path with shorter delay, etc.) by solving fox a shortest path from the starting level to the ending level. The placement of the functional blocks (along with any functional blocks affected by the introduction of the updated critical path) may be updated according to the updated critical path.

The logic design equipment may determine whether the updated critical path improves the performance (e.g., the maximum operating frequency) of the circuit design. If the performance of the circuit design is improved, the updated placement of the plurality of functional blocks may be cached in memory (e.g., in memory circuitry within the logic design equipment). If the performance of the circuit design is improved, and in particular if the performance of the circuit design is improved beyond an improvement threshold, a new critical path may be identified in the circuit design to be optimized and updated.

In accordance with any of the above arrangements, non-transitory computer-readable storage media may include instructions for performing the operations described herein. Further features of the invention, its nature and various advantages, will be more apparent from the accompanying drawings and the following detailed description of the preferred embodiments.

DETAILED DESCRIPTION

Embodiments of the present invention relate to integrated circuits and, more particularly, to ways for improving placement of hardware resources in generating logic designs that are implemented on the integrated circuits.

Figure 1:
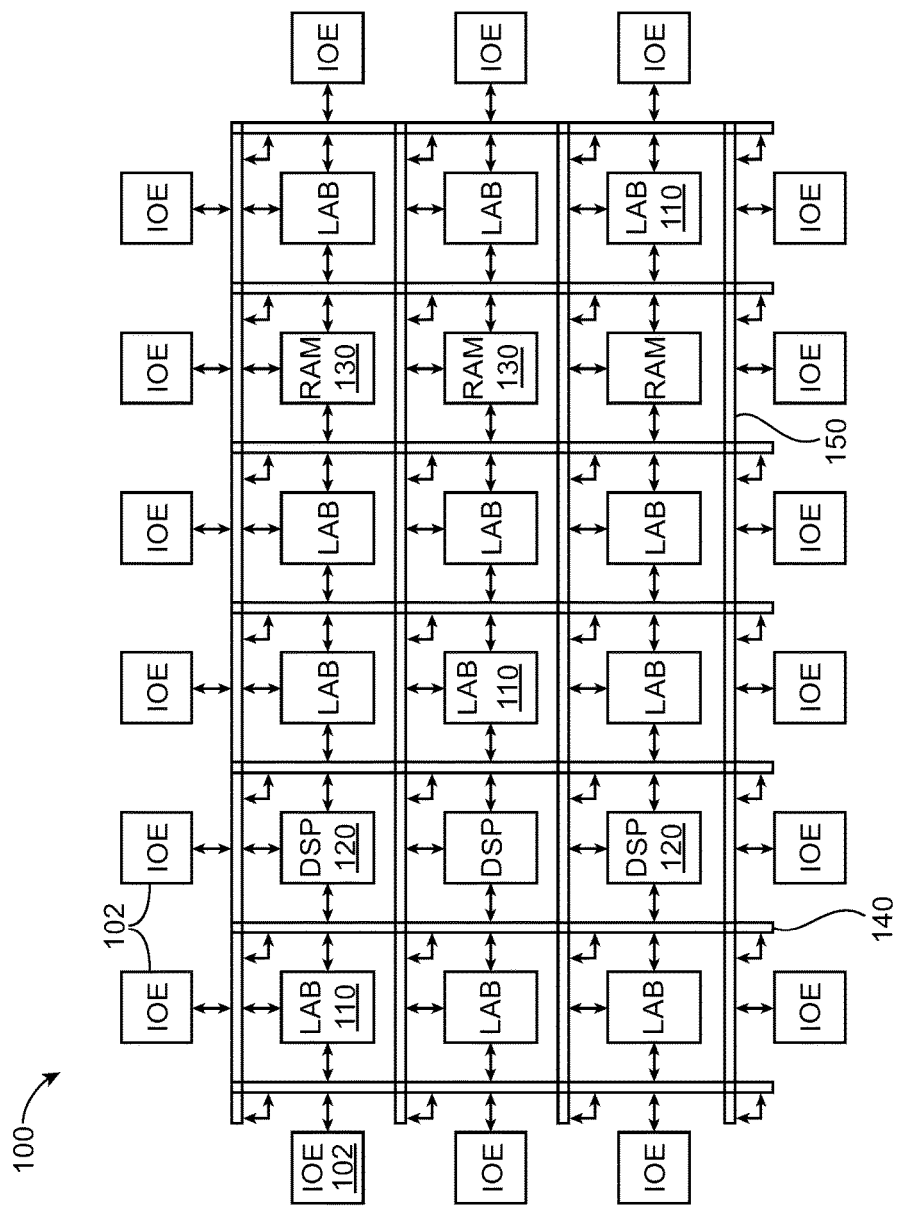
FIG. 1 is a diagram of an illustrative integrated circuit having an exemplary routing topology in accordance with an embodiment.

An illustrative embodiment of an integrated circuit such as programmable logic device (PLD) 100 having an exemplary interconnect circuitry is shown in FIG. 1. As shown in FIG. 1, the programmable logic device (PLD) may include a two-dimensional array of functional blocks, including logic array blocks (LABs) 110 and other functional, blocks, such as random access memory (RAM), blocks 130 and digital signal processing (DSP) blocks 120, for example. Functional blocks such as LABs 110 may include smaller programmable regions (e.g., logic elements, configurable logic blocks, or adaptive logic modules) that receive input signals and perform custom functions on the input signals to produce output signals.

Programmable logic device 100 may contain programmable memory elements. Memory elements may be loaded with configuration data (also called programming data) using input/output elements (IOEs) 102. Once loaded, the memory elements each provide a corresponding static control signal that controls the operation of an associated functional block (e.g., LABs 110, DSP 120, RAM 130, or input/output elements 102).

In a typical scenario, the outputs of the loaded memory elements are applied to the gates of metal-oxide-semiconductor transistors in a functional block to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic crates, pass crates, etc.

The memory elements may use any suitable volatile and/or non-volatile memory structures such as random-access-memory (RAM) cells, fuses, antifuses, programmable read-only-memory memory cells, mask-programmed and laser-programmed structures, combinations of these structures, etc. Because the memory elements are loaded with configuration data during programming, the memory elements are sometimes referred to as configuration memory, configuration RPM (CRAM), configuration memory elements, or programmable memory elements.

In addition, the programmable logic device may have input/output elements (IOEs) 102 for driving signals off of PLD and for receiving signals from other devices. Input/output elements 102 may include parallel input/output circuitry, serial data transceiver circuitry, differential receiver and transmitter circuitry, or other circuitry used to connect one integrated circuit to another integrated circuit. As shown, input/output elements 102 may be located around the periphery of the chip. If desired, the programmable logic device may have input/output elements 102 arranged in different ways. For example, input/output elements 102 may form one or more columns of input/output elements that may be located anywhere on the programmable logic device (e.g., distributed evenly across the width of the PLD). If desired, input/output elements 102 may form one or more rows of input/output elements (e.g., distributed across the height of the PLD). Alternatively, input/output elements 102 may form islands of input/output elements that may be distributed over the surface of the PLD or clustered in selected areas.

The PLD may also include programmable interconnect circuitry in the form of vertical routing channels 140 (i.e., interconnects formed along a vertical axis of PLD 100) and horizontal routing channels 150 (i.e., interconnects formed along a horizontal axis of PLD 100), each routing channel including at least one track to route at least one wire. If desired, the interconnect circuitry may include double data rate interconnections and/or single data rate interconnections. A double data rate interconnection may convey twice the amount of data compared to a single data rate interconnection when operated at the same clock frequency.

If desired, routing wires may be shorter than the entire length of the routing channel. A length L wire may span L functional blocks. For example, a length four wire may span four blocks. Length four wires in a horizontal routing channel may be referred to as "H4" wires, whereas length four wires in a vertical routing channel may be referred to as "V4" wires.

Different PLDs may have different functional blocks which connect to different numbers of routing channels. A three-sided routing architecture is depicted in FIG. 1 where input and output connections are present on three sides of each functional block to the routing channels. Other routing architectures are also intended to be included within the scope of the present invention. Examples of other routing architectures include 1-sided, 1½-sided, 2-sided, and 4-sided routing architectures.

In a direct drive routing architecture, each wire is driven at a single logical point by a driver. The driver may be associated with a multiplexer which selects a signal to drive on the wire. In the case of channels with a fixed number of wires along their length, a driver may be placed at each starting point of a wire.

Note that other routing topologies, besides the topology of the interconnect circuitry depicted in FIG. 1, are intended to be included within the scope of the present invention. For example, the routing topology may include wires that travel diagonally or that travel horizontally and vertically along different parts of their extent, as well as wires that are perpendicular to the device plane in the case of three dimensional integrated circuits, and the driver of a wire may be located at a different point than one end of a wire. The routing topology may include global wires that span substantially all of PLD 100, fractional global wires such as wires that span part of PLD 100, staggered wires of a particular length, smaller local wires, or arty other suitable interconnection resource arrangement.

Furthermore, it should be understood that embodiments of the present invention, may be implemented in any integrated circuit. If desired, the functional blocks of such an integrated circuit may be arranged in more levels or layers in which multiple functional blocks are interconnected to form still larger blocks. Other device arrangements may use functional blocks that are not arranged in rows and columns.

Figure 2:
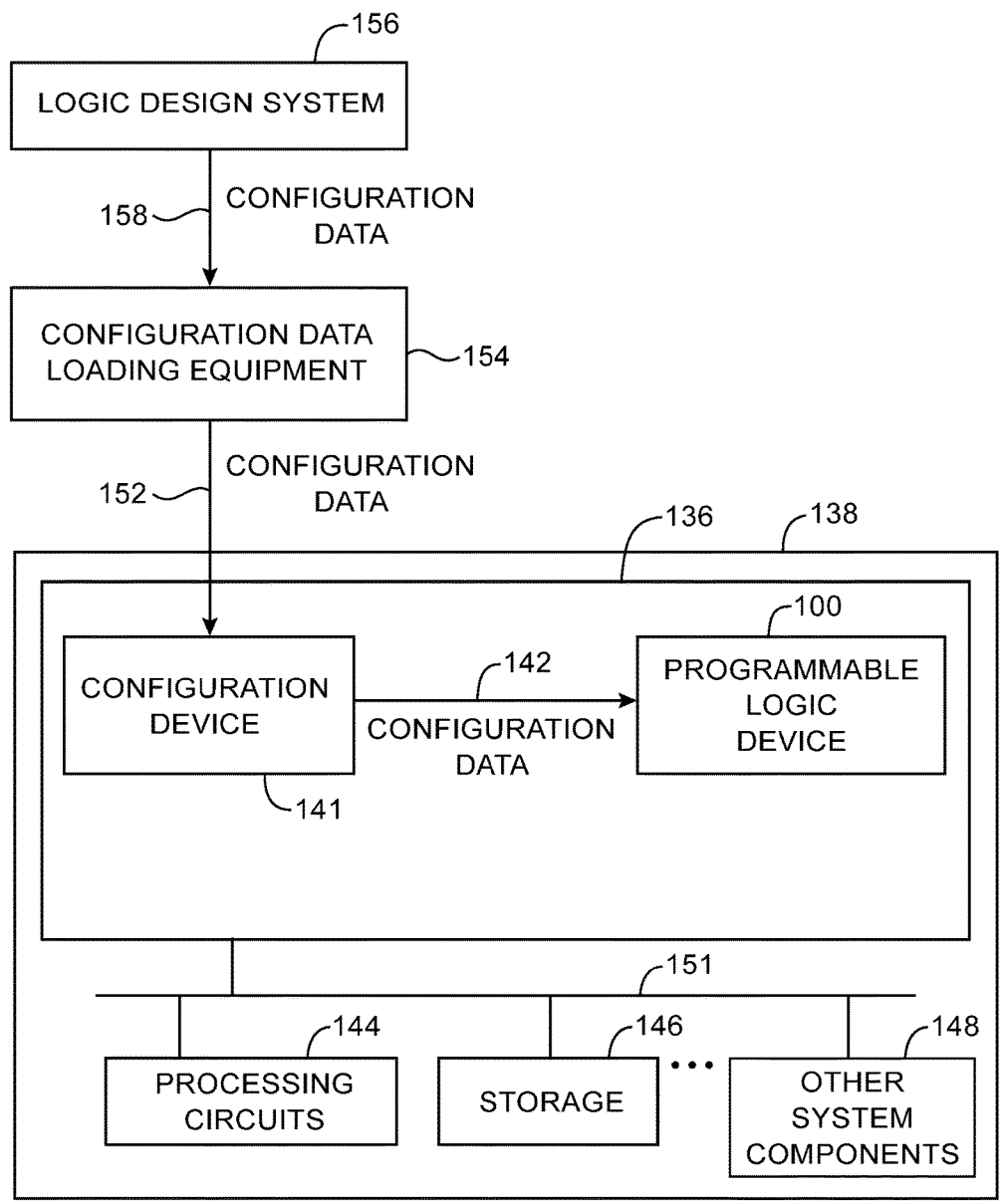
FIG. 2 is an illustrative diagram showing how configuration data may be generated by a logic design system and loaded into a programmable device in accordance with an embodiment.

The various structures and components that are included in an integrated circuit can be designed using a circuit design system. An illustrative system environment for device 100 is shown in FIG. 2. Device 100 may, for example, be mounted on a board 136 in a system 138. In general, programmable logic device 100 may receive configuration data from programming equipment or from other suitable equipment or device. In the example of FIG. 2, programmable logic device 100 is the type of programmable logic device that receives configuration data from an associated integrated circuit 141. With this type of arrangement, circuit 141 may, if desired, be mounted on the same board 136 as programmable logic device 100. Circuit 141 may be an erasable-programmable read-only memory (EPROM) chip, a programmable logic device configuration data loading chip with built-in memory (sometimes referred to as a configuration device), or other suitable devices. When system 138 boots up (or at another suitable time), the configuration data for configuring the programmable logic device may be supplied to the programmable logic device from device 141, as shown schematically by path 142. The configuration data that is supplied to the programmable logic device may be stored in the programmable logic device in its configuration random-access-memory elements.

System 138 may include processing circuits 144, storage 146, and other system components 148 that communicate with device 100. The components of system 138 may be located on one or more boards such as board 136 or other suitable mounting structures or housings and may be interconnected by buses and other electrical paths 151. If desired, programmable device 100 may be loaded with configuration data without mounting device 100 and/or configuration device 141 to board 136 (e.g., using any desired configuration data loading equipment).

Configuration device 141 may be supplied with the configuration data for device 100 (sometimes referred to herein as target circuit or target device 100) over a path such as path 152. Configuration device 141 may, for example, receive the configuration data from configuration data loading equipment 154 or other suitable equipment that stores this data in configuration device 141. Device 141 may be loaded with data before or after installation on board 136.

It can be a significant undertaking to design and implement a desired (custom) logic circuit in a programmable logic device. Logic designers therefore generally use logic design systems based on computer-aided-design (CAD) tools to assist them in designing circuits. A logic design system can help a logic designer design and test complex circuits for a system. When a design is complete, the logic design system may be used to generate configuration data for electrically programming the appropriate programmable logic device.

As shown in FIG. 2, the configuration data produced by a logic design system 156 (sometimes referred to herein as logic design equipment 156, logic design computer 156, logic design processor 156, logic design computing equipment 156, logic design circuitry 156, or data stream generation circuitry 156) may be provided to equipment 154 over a path such as path 158. Equipment 154 provides the configuration data to device 141, so that device 141 can later provide this configuration data to the programmable logic device 100 over path 142. System 156 may be based on one or more computers and one or more software programs. In general, software and data may be stored on any computer-readable medium (storage) in system 156. System 156 may include processing circuitry in the form of one or more processors such as a central processing unit (CPU). In general, any desired processing circuitry may be formed on system 156. For example, system 156 may include solver circuitry or solver engine. Solver circuitry may be used to solve constrained systems of equations, for example.

In a typical scenario, logic design system 156 is used by a logic designer to create a custom circuit (logic) design. For example, the logic designer may provide input commands to logic design system 156 (e.g., by selecting on screen commands displayed on a display screen, by entering commands using a user input device such as a mouse and/or keyboard, etc.). The system 156 produces corresponding configuration data which is provided to configuration device 141. Upon power-up, configuration device 141 and data loading circuitry on programmable logic device 100 are used to load the configuration data into CRAM cells on device 100. Device 100 may then be used in normal operation of system 138. The example of FIG. 2 is merely illustrative. In general, any desired system may be used to load configuration data generated by logic design system 156 onto programmable logic device 100.

Figure 3:
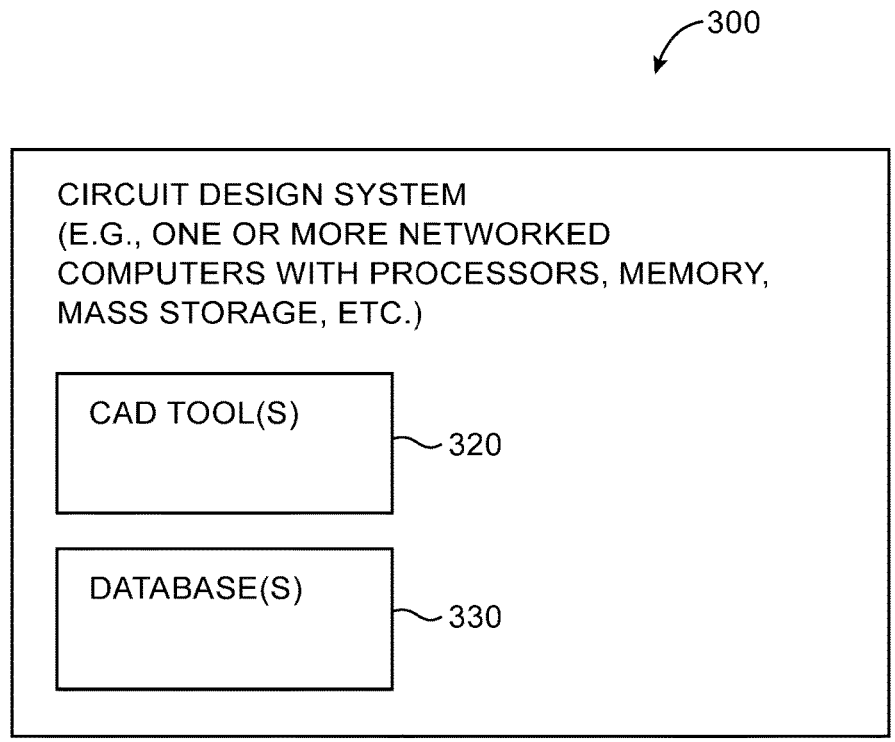
FIG. 3 is a diagram of a circuit design system that may be used to design integrated circuits in accordance with an embodiment.

An illustrative circuit design system 300 in accordance with an embodiment is shown in FIG. 3. If desired, circuit design system of FIG. 3 may be used in a logic design system such as logic design system 156 shown in FIG. 2. Circuit design system 300 may be implemented on integrated circuit design computing equipment. For example, system 300 may be based on one or more processors such as personal computers, workstations, etc. The processor(s) may be linked using a network (e.g., a local or wide area network). Memory in these computers or external memory and storage devices such as internal and/or external hard disks may be used to stare instructions and data.

Software-based components such as computer-aided design tools 320 and databases 330 reside on system 300. During operation, executable software such as the software of computer aided design tools 320 runs on the processor(s) of system 300. Databases 330 are used to store data for the operation of system 300. In general, software and data may be stored on any computer-readable medium (storage) in system 300. Such storage may include computer memory chips, removable and fixed media such as hard disk drives, flash memory, compact discs (CDs), digital versatile discs (DVDs), Blu-ray discs (BDs), other optical media, and floppy diskettes, tapes, or any other suitable memory or storage device(s). When the software of system 300 is installed, the storage of system 300 has instructions and data that cause the computing equipment in system 300 to execute various methods (processes). When performing these processes, the computing equipment is configured to implement the functions of the circuit design system.

The computer aided design (CAD) tools 320, some or all of which are sometimes referred to collectively as a CAD tool, a circuit design tool, or an electronic design automation (EDA) tool, may be provided by a single vendor or by multiple vendors. Tools 320 may be provided as one or more suites of tools (e.g., a compiler suite for performing tasks associated with implementing a circuit design in a programmable logic device) and/or as one or more separate software components (tools). Database(s) 330 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Figure 4:
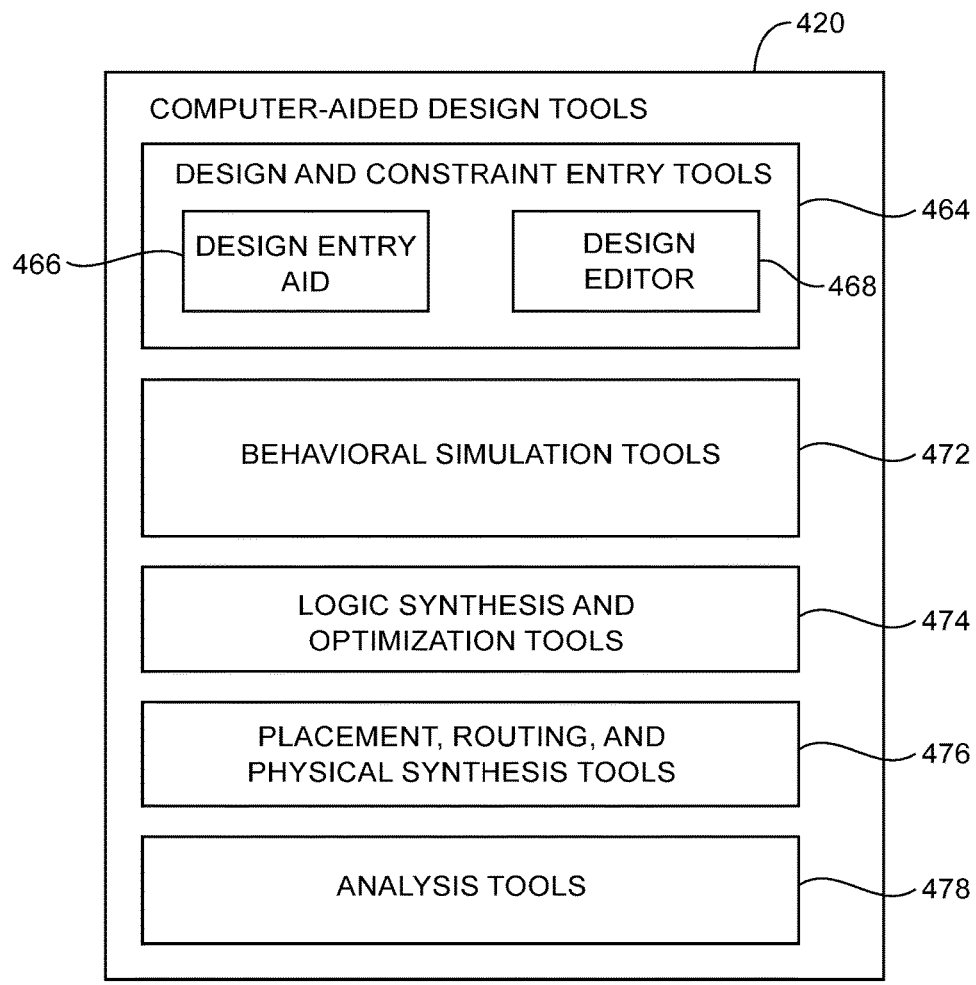
FIG. 4 is a diagram of illustrative computer-aided design (CAD) tools that may be used in a circuit design system in accordance with an embodiment.

Illustrative computer aided design tools 420 that may be used in a circuit design system, such as circuit design system 300 of FIG. 3 are shown in FIG. 4.

The design process may start with the formulation of functional specifications of the integrated circuit design (e.g., a functional or behavioral description of the integrated circuit design). A circuit designer may specify the functional operation of a desired circuit design using design and constraint entry tools 464. Design and constraint entry tools 464 may include tools such as design and constraint entry aid 466 and design editor 468. Design and constraint entry aids such as aid 466 may be used to help a circuit designer locate a desired design from a library of existing circuit designs and may provide computer-aided assistance to the circuit designer for entering (specifying) the desired circuit design.

As an example, design and constraint entry aid 466 may be used to present screens of options for a user. The user may click on on-screen options to select whether the circuit being designed should nave certain features. Design editor 468 may be used to enter a design (e.g., by entering lines of hardware description language code), may be used to edit a design obtained from a library (e.g., using a design and constraint entry aid) or may assist a user in selecting and editing appropriate prepackaged code/designs.

Design and constraint entry tools 464 may be used to allow a circuit designer to provide a desired circuit design using any suitable format. For example, design and constraint entry tools 464 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 464 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 464 may allow the circuit designer to provide a circuit design to the circuit design system 300 using a hardware description language such as Verilog hardware description language (Verilog HDL), Very High Speed Integrated Circuit Hardware Description Language (VHDL), SystemVerilog, or a higher-level circuit description language such as OpenCL or SystemC, just to name a few. The designer of the integrated circuit design can enter the circuit design by writing hardware description language code with editor 468. Blocks of code may be imported from user-maintained or commercial libraries if desired.

After the design has been entered using design and constraint entry tools 464, behavioral simulation tools 472 may be used to simulate the functionality of the circuit design. If the functionality of the design is incomplete or incorrect, the circuit designer can make changes to the circuit design using design and constraint entry tools 464. The functional operation of the new circuit design may be verified using behavioral simulation tools 412 before synthesis operations have been performed using tools 474. Simulation tools such as behavioral simulation tools 472 may also be used at other stages in the design flow if desired (e.g., after logic synthesis). The output of the behavioral simulation tools 472 may be provided to the circuit designer in any suitable format (e.g., truth tables, timing diagrams, etc.).

Once the functional operation of the circuit design has been determined to be satisfactory, logic synthesis and optimization tools 474 may generate a gate-level netlist of the circuit design, for example using gates from a particular library pertaining to a targeted process supported by a foundry, which has been selected to produce the integrated circuit. Alternatively, logic synthesis and optimization tools 474 may generate a gate-level netlist of the circuit design using gates of a targeted programmable logic device (i.e., in the logic and interconnect resources of a particular programmable logic device product or product family).

Logic synthesis and optimization tools 474 may optimize the design by making appropriate selections of hardware to implement different logic functions in the circuit design based on the circuit design data and constraint data entered by the logic designer using tools 464. As an example, logic synthesis and optimization tools 474 may perform multi-level logic optimization and technology mapping based on the length of a combinational path between registers in the circuit design and corresponding timing constraints that were entered by the logic designer using tools 464.

After logic synthesis and optimization using tools 474, the circuit design system may use tools such as placement, routing, and physical synthesis tools 476 to perform physical design steps (layout synthesis operations). Tools 476 can be used to determine where to place each gate of the gate-level netlist produced by tools 474. For example, if two counters interact with each other, tools 476 may locate these counters in adjacent regions to reduce interconnect delays or to satisfy timing requirements specifying the maximum permitted interconnect delay. Tools 476 create orderly and efficient implementations of circuit designs for any targeted integrated circuit (e.g., for a given programmable integrated circuit such as a field-programmable gate array (FPGA)).

Tools such as tools 474 and 476 may be part of a compiler suite (e.g., part of a suite of compiler tools provided by a programmable logic device vendor). In certain embodiments, tools such as tools 474, 476, and 478 may also include timing analysis tools such as timing estimators. This allows tools 474 and 476 to satisfy performance requirements (e.g., timing requirements) before actually producing the integrated circuit.

After an implementation of the desired circuit design has been generated using tools 476, the implementation of the design may be analyzed and tested using analysis tools 478. For example, analysis tools 478 may include timing analysis tools, power analysis tools, or formal verification tools, just to name few.

After satisfactory optimization operations have been completed using tools 420 and depending on the targeted integrated circuit technology, tools 420 may produce a mask-level layout description of the integrated circuit or configuration data for programming the programmable logic device.

Figure 5:
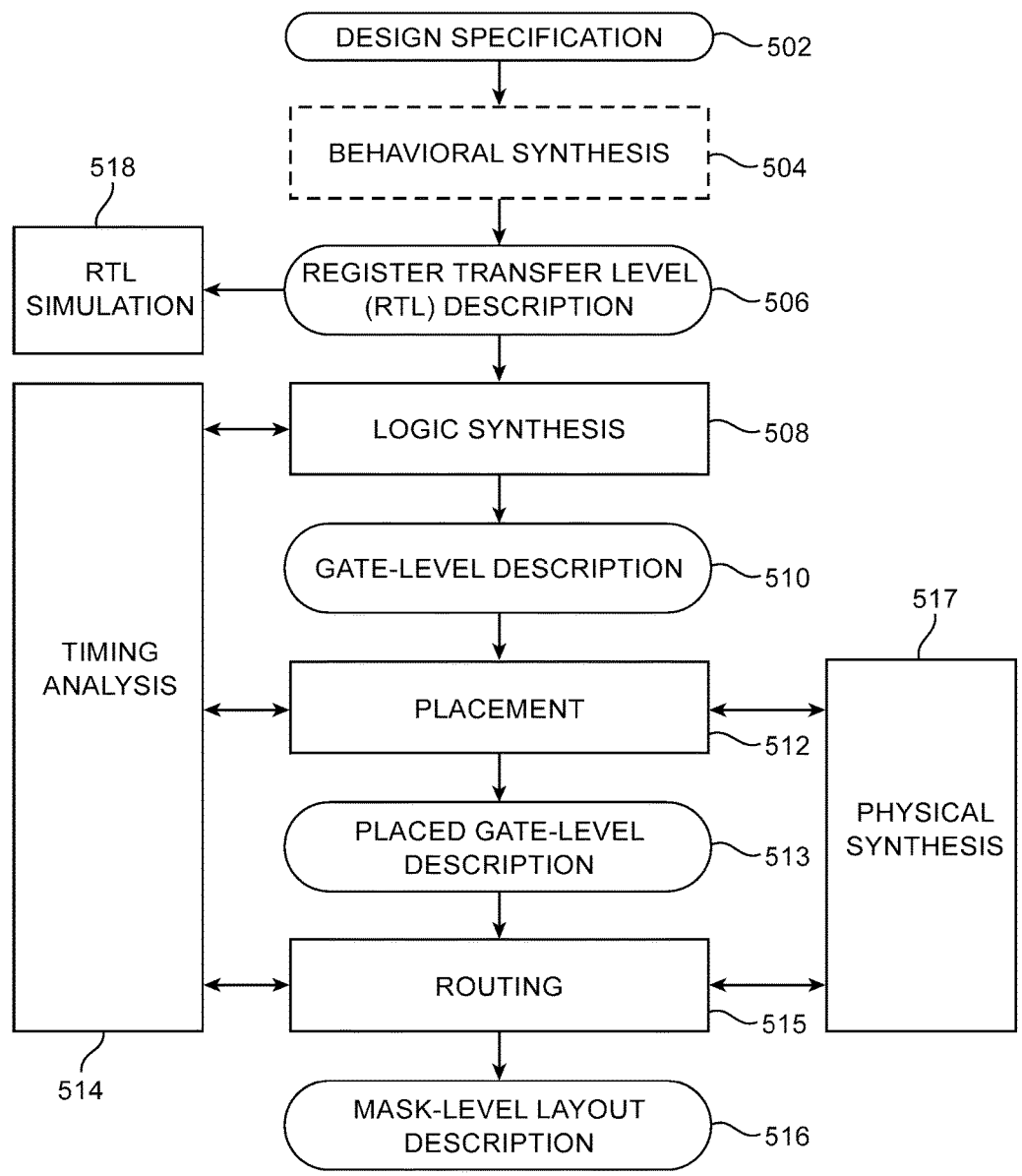
FIG. 5 is a flow chart of illustrative steps for designing an integrated circuit in accordance with an embodiment.

Illustrative operations involved in using tools 420 of FIG. 4 to produce the mask-level layout description of the integrated circuit are shown in FIG. 5. As shown in FIG. 5, a circuit designer may first provide a design specification 502. The design specification 502 may, in general, be a behavioral description provided in the form of an application code (e.g., C code, C++ code, SystemC code, OpenCL code, etc.). In some scenarios, the design specification may be provided in the form of a register transfer level (RTL) description 506.

The RTL description may have any form of describing circuit functions at the register transfer level. For example, the RTL description may be provided using a hardware description language such as the Verilog hardware description language (Verilog HDL or Verilog), the SystemVerilog hardware description language (SystemVerilog HDL or SystemVerilog), or the Very High Speed Integrated Circuit Hardware Description Language (VHDL). If desired, a portion or all of the RTL description may be provided as a schematic representation or in the form of a code using OpenCL, MATLAB, Simulink, or other high-level synthesis (HLS) language.

In general, the behavioral design specification 502 may include untimed or partially timed functional code (i.e., the application code does not describe cycle-by-cycle hardware behavior), whereas the RTL description 506 may include a fully timed design description that details the cycle-for-cycle behavior of the circuit at the register transfer level.

Design specification 502 or RTL description 506 may also include target criteria such as area use, power consumption, delay minimization, clock frequency optimization, or any combination thereof. The optimization constraints and target criteria may be collectively referred to as constraints.

Those constraints can be provided for individual data paths, portions of individual data paths, portions of a design, or for the entire design. For example, the constraints may be provided with the design specification 502, the RTL description 506 (e.g., as a pragma or as an assertion), in a constraint file, or through user input (e.g., using the design and constraint entry tools 464 of FIG. 4), to name a few.

At step 504, behavioral synthesis (sometimes also referred to as algorithmic synthesis) may be performed to convert the behavioral description into an RTL description 506. Step 504 may be skipped if the design specification is already provided in form of an RTL description.

At step 518, behavioral simulation tools 472 may perform an RTL simulation of the RTL description, which may verify the functionality of the RTL description. If the functionality of the RTL description is incomplete or incorrect, the circuit designer can make changes to the HDL code (as an example). During RTL simulation 518, actual results obtained from simulating the behavior of the RTL description may be compared with expected results.

During step 508, logic synthesis operations may generate gate-level description 510 using logic synthesis and optimization tools 474 from FIG. 4. The output of logic synthesis 508 is a gate-level description 510 of the design.

During step 512, placement operations using for example placement tools 476 of FIG. 4 may place the different gates in gate-level description 510 in a preferred location on the targeted integrated circuit to meet given target criteria (e.g., minimize area and maximize routing efficiency or minimize path delay and maximize clock frequency or minimize overlap between logic elements, or any combination thereof). The output of placement 512 is a placed gate-level description 513, which satisfies the legal placement constraints of the underlying target device.

During step 515, routing operations using for example routing tools 476 of FIG. 4 may connect the gates from the placed gate-level description 513. Routing operations may attempt to meet given target criteria (e.g., minimize congestion, minimize path delay and maximize clock frequency, satisfy minimum delay requirements, or any combination thereof). The output of routing 515 is a mask-level layout description 516 (sometimes referred to as routed gate-level description 516).

While placement and routing is being performed at seeps 512 and 515, physical synthesis operations 517 may be concurrently performed to further modify and optimize the circuit design (e.g., using physical synthesis tools 476 of FIG. 4). If desired, register retiming operations may be performed during physical synthesis step 517.

Figure 6:
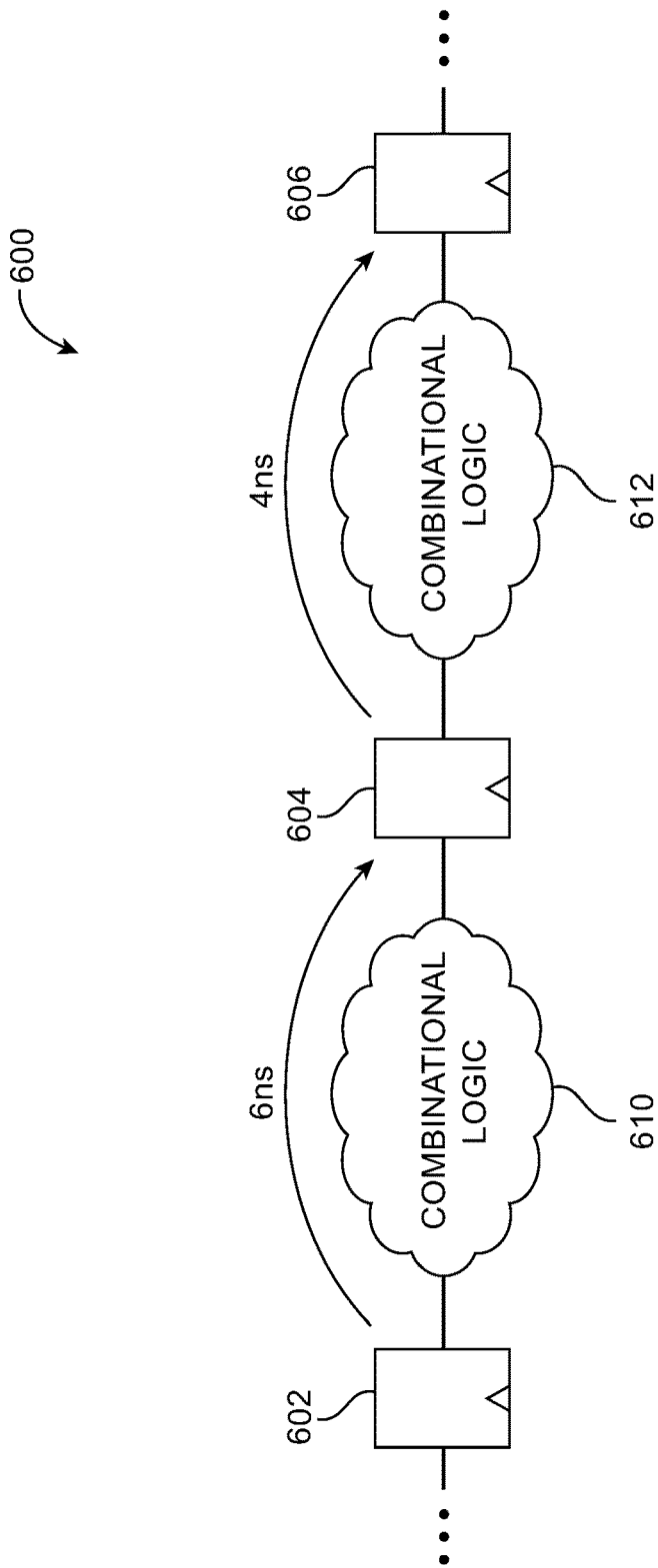
FIG. 6 is a diagram of an illustrative path with delays across different combinational logic within an integrated circuit in accordance with an embodiment.

FIG. 6 shows an example of a portion of a circuit design that PLD 100 may implement. Portion 600 of the circuit design may include registers 602, 604, and 606. Combinational logic 610 may be coupled between (e.g., interposed between) registers 602 and 604. In other words, register 602 may send a signal though combinational logic 610 to register 604. As an example, the delay on the path from register 602 though combinational logic 610 to register 604 may be a delays of 6 nanoseconds (ns). Similarly, combinational logic 612 may be coupled between registers 604 and 606. In other words, register 604 may send a signal though combinational logic 612 to register 606. As an example, the delay on the path from register 604 though combinational logic 610 to register 604 may be a delay of 4 ns.

The circuit design that PLD 100 implements may be include a large number of paths such as the path from register 602 to register 604 or the path from register 604 to register 606. The large number of paths may each have a given delay and a corresponding delay target. The given delay subtracted from the corresponding delay target may generate a delay slack value. The path with the smallest delay slack value may be the most critical path within the circuit design. The paths with slack delay values below a given threshold may be labelled as critical paths within the circuit design. For example, the extent to which different delay slack values are below the given threshold may be mapped onto a zero to one scale, where zero is a least critical path and one is a most critical path. In other words, a given critical path may be identified by comparing a delay slack of the given critical path to a slack threshold value.

For example, if both the path from register 602 to register 604 and the path from register 604 to 606 have the same delay target, all other factors held constant, the path from register 602 to register 604 may have a smaller slack value than the slack value associated with the path from register 604 to register 606. In this example, the path from register 602 to register 604 may be the more critical path.

The operating frequency for PLD 100 may be limited by the slowest path (e.g., the path with the highest delays). In other words, the delay across a given path may be inversely correlated with (e.g., inversely proportional to) the operating frequency of the given path. For example, portion 600 may include a critical path within the circuit design. As such, the maximum operating frequency Fmax may be limited by the critical path of portion 600. The critical path (e.g., the path from register 602 to register 604) may have a delay of 6 ns, which may correspond to an operating frequency of 166 MHz, for example. The maximum operating frequency Fmax of the logic design implemented within PLD 100 may therefore be 166 MHz.

It may be desirable to reduce the delay of the critical path within portion 600. As an example, by optimizing placement within combinational logic 610, the new path from, register 602 to register 604 though combinational logic 610 (e.g., an improved path) may have an improved delay of 4 ns. The improved delay of 4 ns may consequently improve the delay of the critical path within portion 600 from 6 ns to 4 ns. The new delay of 4 ns may correspond to an operating frequency of 250 MHz, which may also be the new maximum operating frequency Fmax of the logic design (assuming the improved path is the most critical path).

This is merely illustrative. If desired, other paths may be improved to improve the overall delay of the path from, register 602 to register 606 as shown in FIG. 6. For example, the delay associated with the path from register 604 to 606 may be improved to 3 ns, if the path from register 604 to register 606 were to be one of the more critical paths. For example, the delay associated with the path from register 602 to 604 may be improved to 2 ns.

As an example, the paths from register 602 to register 604 may not include the most critical path within the logic design. As such, the delay associated with more critical paths within the logic design may be improved first or concurrently with the path from register 602 to register 604. The specifics of improving the delay of critical paths are described in further detail in FIGS. 7-11.

As described in FIG. 6, a register 602 may send a signal that is received at register 604. In other words, register 602 may be a source for the signal, and register 604 may be a sink for the signal. A source may be any circuitry that generates or propagates data (e.g., signal). A corresponding sink may be any circuitry that receives the data. The sink may transfer the data or perform, further processing on the data, for example, FIG. 7A shows an exemplary network that includes multiple source-sink pairs.

Source W may be coupled to sink X via path 700. Source W may also be coupled to sink Z via path 702. Source W may further be coupled to sink Z via path 704. In other words, source W and sink X that are connected may form a source-sink pair or a 2-pin net (sometimes referred to herein as a "tnet"). Similarly, source W and sink Y, and source W and sink Z may form two more 2-pin nets. Paths 700, 702, and 704 may include intervening combinational logic (e.g., as shown in FIG. 6), wires, or any other types of intervening circuitry. Depending on the number, type, complexity, length, and other factors of the intervening circuitry, each path may be associated with a corresponding propagation delay. For example, a delay along path 700 may be shorter than a delay along path 702, and a delay along path 702 may be shorter than a delay along path 704. As such, if paths 700, 702, and 704 have the same target delay, then longest path 704 may be the most critical path and shortest path 700 may be the least critical path.

Figure 7A:
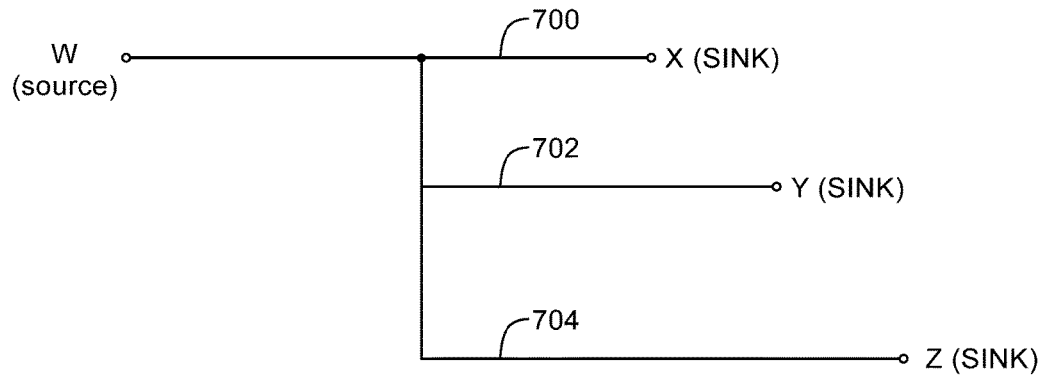
FIGS. 7A and 7B are diagrams of illustrative representations of source-sink pairs within an integrated circuit in accordance with an embodiment.
Figure 7B:
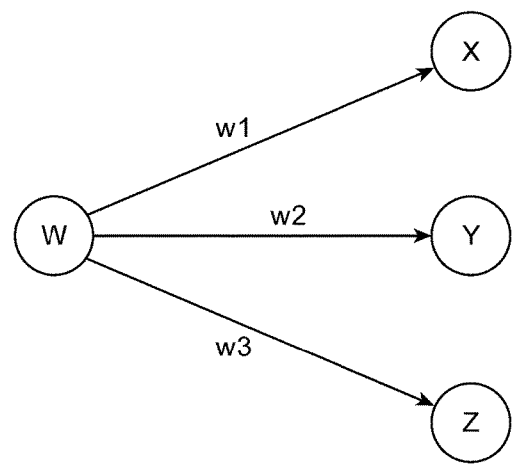

FIG. 7B shows a different representation of the exemplary network of source-sink pairs as shown in FIG. 7A. In particular, FIG. 7B snows a graph or tree representation of source-sink pairs. The graph includes nodes W, X, Y, and Z, of which node W may be a source and nodes X, Y, and Z may be sinks. The graph may include directional arcs or edges (e.g., unidirectional edges or bidirectional edges). For example, the edge coupling node W to X (referred to herein as edge WX) may point from node W (a source) to X (a sink). Each edge may have a weight that is the delay of the path represented by the edge. For example, edge WX may have weight w1. The edge coupling node W to X may correspond to path 700. As such weight w1 corresponds to the delay on path 700. Similarly, edges WY and WZ may represent paths 702 and 704, respectively, and the weights w2 and w3 may be the delay (e.g., propagation delay) along paths 702 and 704.

In the scenario, in which paths 700, 702, and 704, have respective delays of 2 ns, 3 ns, and 4 ns, for example. Weights w1, w2, and w3 may be equal to 2 ns, 3 ns, and 4 ns, respectively. Alternatively, weights w1, w2, and w3 may be proportional to the corresponding delays (e.g., calculated relative to target delays, normalized in terms of slack, etc.).

FIGS. 7A and 7B are merely illustrative. If desired any number of sources may be coupled to any number of sinks. For example, PLD 100 may implement a circuit design that includes a large number sources and sinks that include suitable interconnections between the sources and the sinks. If desired, each source-sink pair may transfer different signals or data corresponding to the function the source and the sink. For example, source W may send a first signal to sink X via path 700, and source W may send a second signal different from the first signal to sink Y via path 702.

A circuit design to be implemented on a programmable integrated circuit may include a large number of source-sink pairs within the circuit design. As such the corresponding paths linking the source-sink pairs may have a large number of varying delays. The corresponding paths may be linked to another to generate a chain of source-sink paths. The chain of source-sink paths may have a critical amount of delay (e.g., a delay that is close to or higher than the target delay). The chain of source-sink paths that have the critical amount of delay may be a critical path. Many such chains of source-sink paths may exist in the circuit design. Therefore, the circuit design may be optimized to reduce the delay or latency of one or more critical paths.

The optimization process may take place after placed gate-level description 513 in FIG. 5 is generated after placement 512 has occurred. In other words, CAD tools 420 in FIG. 4 (e.g., more specifically, placement tools 476) may perform delay-reducing placement operations using placed gate-level description 513 as an input. CAD tools 420 may generate an output of delay-reducing placement of the circuit design with improved latency or operating frequency. The output may further undergo routing operations 515 in FIG. 5.

It is worth noting that design systems may optimize the logic design by making appropriate selections of hardware to implement different logic functions in the circuit design based on the circuit design data and constraint data entered by the logic designer. Tools (such as tools 474 of FIG. 4) may optimize the design while ensuring that device constraints are satisfied. Such device constraints may include legality rules (sometimes referred to herein as legality constraints). The legality rules may specify what placement of logic elements within the design and what interconnections are legal or illegal (e.g., which placements and interconnections satisfy or do not satisfy the legality rules).

Examples of legality constraints that may be imposed include rules about where certain logic elements can be placed, rules dictating that multiple elements cannot share a single location on the design, clustering rules, rules dictating how elements can be connected, clocking rules (e.g., constraints on how each logic element in the design is clocked or how many clocks each logic cluster may receive), packing rules, or other desired legality constraints.

As previously described, the input of the delay-reducing placement operations may be placed gate-level description 513 that satisfy legality constraints. Similarly, any changes made to the gate-level description 513 during the delay-reducing placement operations may also satisfy the legality constraints. In fact, it may be desirable to check and enforce the constraint that any changes made to the gate-level description must adhere to the legality constraints. As such, there may be only limit options for placement changes of functional blocks within a circuit design.

Figure 8:
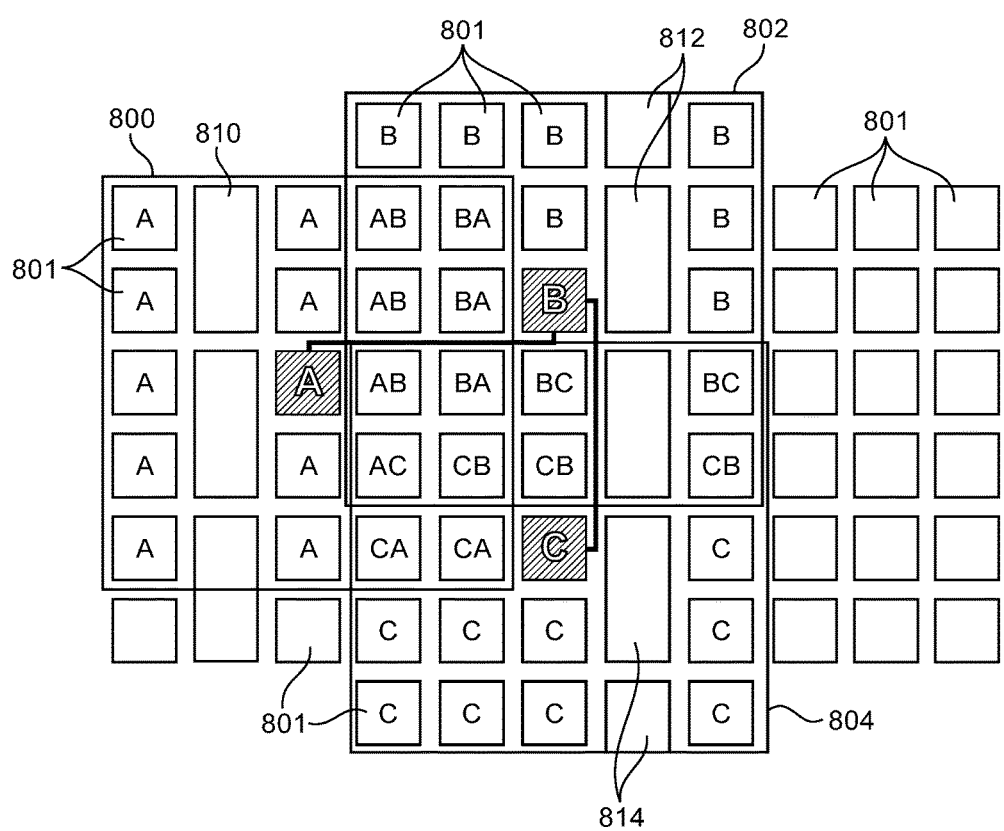
FIG. 8 is a diagram of an illustrative logic design within an integrated circuit which includes functional, blocks and candidate locations for the functional blocks in accordance with an embodiment.

FIG. 8 shows an exemplary circuit design that may be implemented on PLD 100. The circuit design may include placeable functional blocks, each of which have a designated (e.g., specified, specialized, etc.) function. The placeable blocks may be placed collectively during placement 512 in FIG. 5. In particular, the circuit design may include functional blocks A, B, and C (e.g., shaded boxes A, B, and C in FIG. 3), along a critical path (e.g., a bolded path in FIG. 8) linking block A to block B to block C. In other words, functional blocks A, B, and C are placed at locations represented by shaded boxes A, B, and C prior to optimization.

To optimize placement of functional blocks along a critical path, CAD tools 420 in FIG. 4 may generate a number of candidate nodes (e.g., candidate move locations, candidate placement locations, or simply candidate locations) for each of the functional blocks coupled along the critical path. For example, CAD tools 420 may generate candidate locations for shaded functional block A within region 800. Region 300 may be selected as a representative neighborhood of shaded functional block A. Region 800 may be a five-by-five functional block region (e.g., a block region that may fit 25 functional blocks 801 arranged in a five row and five column configuration). If desired, instead of functional blocks 801, region 800 may include functional blocks 810. Functional block 810 may take up more area on a circuit design (e.g., double the area on a circuit design than a functional block 801 and may be of a different type from function block 801. For example, functional block 810 may be digital signal processing circuitry.

As shown in FIG. 8, region 800 may include 20 functional blocks 801, each of which may perform the same and/or different functions. The 20 functional blocks 801 within region 800 may take about the same hardware area, for example. Region 800 may also include two-and-a-half functional blocks 810, each of which may also perform the same and/or different functions. Because shaded functional block A is a functional block of the same type (e.g., size) as functional block 801, the candidate locations of block A may be (e.g., may only be) the locations of other functional blocks 801. The locations of functional blocks 801 may be referred to herein as locations 801. Locations may generally refer to the boxes representing functional block placements. However, the locations may either be occupied by a functional block or unoccupied. For example, any locations 801 within region 800 may be a candidate location for functional block A (including shaded box A, which is the current location for functional block A). However, the locations occupied by functional blocks 810 (similarly referred to herein as locations 810) within region 800 may not be candidate locations of functional block A.

Similarly, functional block may be currently placed at shaded box B. To optimize the placement of the functional blocks along the critical path, CAD tools 420 may also generate candidate locations for functional block B. Candidate locations of functional block B may be within a neighborhood (e.g., as defined by region 802). Region 802 may similarly be a five-by-five functional block region. Region 802 may include functional blocks 812 that may be similar to functional group 810 in that a functional block 812 may take up double the hardware area when compared with a functional block 801. Because functional block B is of the same type as functional blocks 801, the candidate locations of functional block B may be any locations 801 within region 802.

Furthermore, functional block C may be currently placed at shaded box C. To optimize the placement of the functional blocks along the critical path, CAD tools 420 may also generate candidate locations for functional block C. Candidate locations of functional block C may be within a neighborhood (e.g., as defined by region 804). Region 804 may similarly be a five-by-five functional block region. Region 804 may include functional blocks 814 that may be similar to functional group 810 or 812 in that a functional block 814 may take up double the hardware area when compared with a functional block 801. Because functional block B is of the same type as functional blocks 801, the candidate locations of functional block B may be any locations 801 within region 802.

The example that functional blocks A, B, and C are the same type as the type of functional blocks 801 is merely illustrative. If desired, an initially placed functional block (e.g., functional block A placed at shaded box A) may be either of type functional block 801, of type functional block 810, or of any other suitable type of functional block. However, it may be desirable that the corresponding candidate locations be of the same type as the initially placed functional block. The example that the neighborhoods, of initially placed functional blocks A, B, and C are represented using five-by-five regions is merely illustrative. If desired, any other suitable region, from which candidate locations are chosen, may be use used. For example, a three-by-three region, a five-by-three, a non-rectangular region, etc., may be used. As another example, the neighborhood of the initially placed functional block may not be centered around the initial placement of the initially placed functional block, if desired. In other words, regions from which candidate locations are selected may include the initially placed position at an off-center location.

Initially placed herein refers to functional block placement after placement 512, which generates a legal placed gate-level description. In other words, initially placed designs are prior to optimizing placement that shortens critical paths as described in the present embodiments.

As shown in FIG. 8, regions 800, 802, and 804 may overlap. As such, candidate placement locations for each functional block (e.g., functional blocks A, B, and C) may also overlap. In other words, a particular functional block 801 may be a candidate location for multiple initially placed functional blocks (e.g., a candidate location for initially placed functional blocks A, B, and C). If desired, a constraint may be placed such that any particular location 801 may be at most a candidate location for two initially placed functional blocks. However, it is important to note that, at most, only one of the initially placed functional blocks may be ultimately placed at the candidate location. "Locations" (e.g., sub-regions or slots 801, 810, 812, and 814) may generally refer to the boxes representing locations for functional block placement. For example, the locations may either be occupied by a functional block or unoccupied.

Unshaded boxes labeled A, B, and C are only candidate locations for the respective initially placed functional blocks (e.g., initially placed at their respective shaded boxes A, B, and C). Unshaded boxes with multiple letter designations (e.g., AB, BA, AC, CA, BC, and CB) may be candidate locations for a combination of initially placed functional blocks as determined by the letter designations. For example, an unshaded boss labeled AB or BA may be a candidate location for either initially placed functional block A or B. Similarly, an unshaded box labeled BC or CB may be a candidate location for either initially placed functional blocks B or C. An unshaded box labeled AC or CA may be a candidate location for either initially placed functional block A or C. The selection of which two functional block candidate locations are represented by a particular location if more than two functional block neighborhoods overlap the particular location may be determined using any suitable method (e.g., using a heuristic, pre-determined, according to other constraints).

Figure 9A:
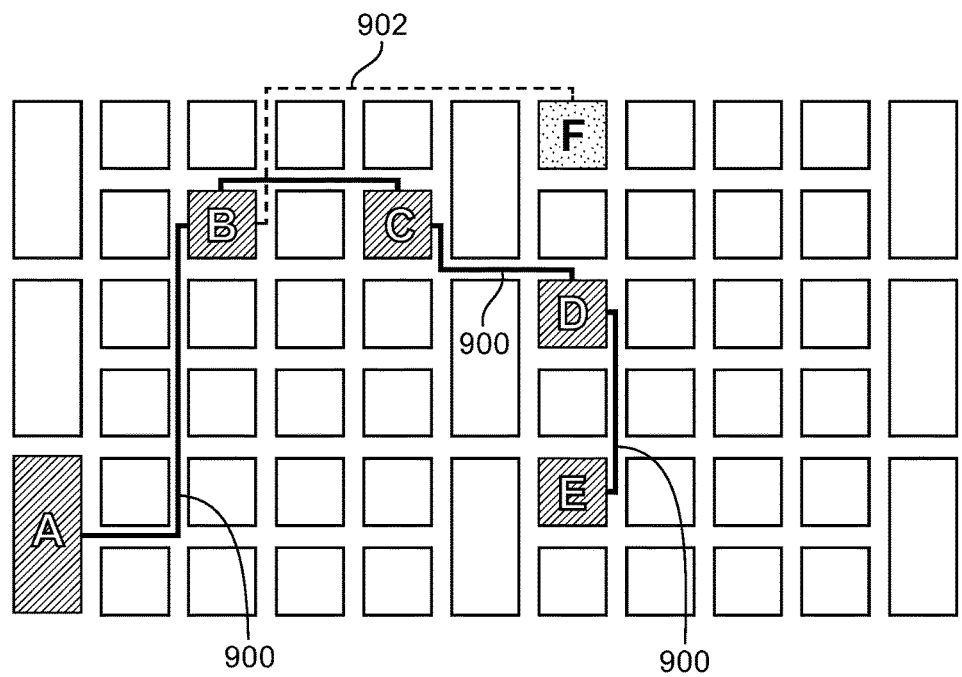
FIG. 9A is a diagram of an illustrative logic design within an integrated circuit which includes a critical path that connects multiple functional blocks in accordance with an embodiment.

FIG. 9A shows an exemplary circuit design that may be implemented on PLD 100 in FIG. 1. Each location (e.g., each box or each rectangular region) may represent a possible location for functional block placement within the circuit design. Each functional block may be placed within the circuit design as a collective unit. In particular, the circuit design may include critical path 900 that is calculated (e.g., generated) based on an initial placement performed during placement step 512. The initial placement may have placed functional block A at shaded box A, functional block B at shaded box B, functional block C at shaded box C, functional block D at shaded box D, functional block E at shaded box E, and functional block F at shaded box E. From the placement of functional blocks within the circuit design, CAD tools 420 in FIG. 4 may determine a critical path or multiple critical paths based on all possible paths within the circuit design as previously described in connection with FIG. 6.

CAD tools 420 may output critical path 900 as a critical path that may be improved (e.g., shortened) to increase maximum operating frequency Fmax. Critical path 908 may couple functional blocks A, B, C, D, and E together. As such, by moving functional blocks A, B, C, D, and E, the length of the critical path may be changed or improved. Non-critical paths (e.g., side paths) may also exist within the circuit design. In particular, side paths may connect additional functional blocks to one of the critical function blocks (e.g., functional blocks A, B, C, D, or E). The side paths may be less critical than the critical path to be optimized, for example.

CAD tools 420 may also keep track of relevant, side paths that are effected when blocks A, B, C, D, or E are moved. In other words, the movement of functional blocks A, B, C, D, or E may affect (e.g., change the length of) all of the paths of coupled to the moved functional block. For example, side path 902 may couple functional block B to functional block F. As such, when CAD tools 420 performs optimizing placement to reduce the length of the critical path by moving functional block B initially placed at shaded box B, the length of side path 902 may also change.

The criticality (e.g., as described in FIG. 6) of side path 902 may be pertinent to where functional block B may be moved. In other words, the criticality of side path 902 may determine the possible candidate placement locations of functional block B. For example, after initial placement and before optimizing placement, path 900 may be more critical than 902. However, it may be undesirable if by CAD tools 420 performing the placement optimization, the criticality of side path 902 increases significantly (e.g., aide path 902 becomes more critical than critical path 900 after the placement optimization). Certain locations within the neighborhood of initially placed functional block B may be removed from consideration as possible candidate placement locations. For example, locations within the neighborhood of functional block B placed at shaded box B that are significantly far from functional block F may be removed from consideration as possible candidate placement locations for functional block B.

In other words, CAD tools may place a constraint on an updated length (e.g., length after a possible move) of the side path (e.g., side path 902), thereby limiting candidate locations for a corresponding functional block (e.g., functional block B). The constraint may provide a hard limit on a side path (e.g., the slack of side path 902 must at least be 0). However, the constraint may be relaxed to provide more options for improving the more current critical path 900. Because performing placement optimization based on the critical path may be an iterative process (e.g., incrementally improve the critical path at each iterative step), a relaxation of the constraint may provide benefits for later iterative steps.

Figure 9B:
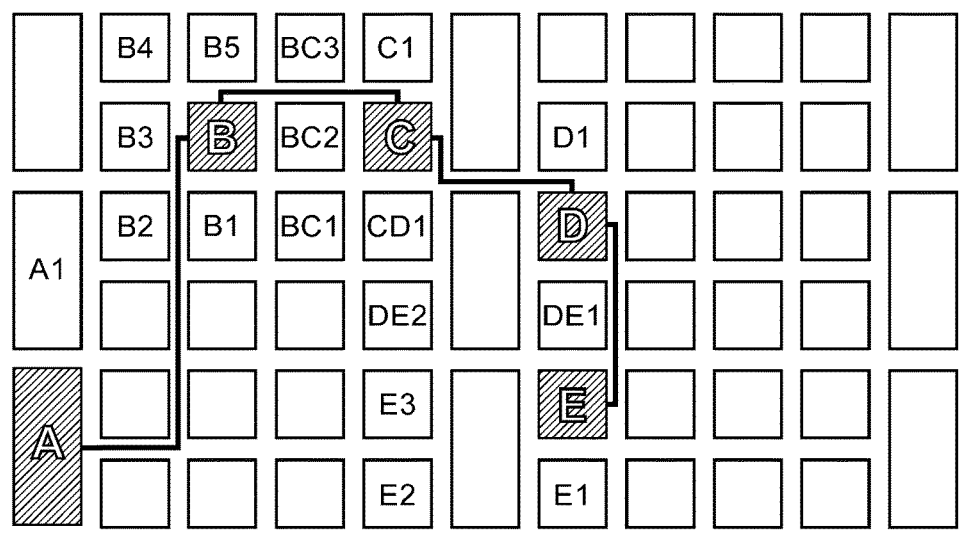
FIGS. 9B and 9C are diagrams of an illustrative logic design within an integrated circuit which includes multiple functional blocks on a critical path and candidate locations for the multiple functional blocks in accordance with an embodiment.

FIG. 9B shows the exemplary circuit design as shown in FIG. 9A and further includes possible candidate locations for functional, blocks around critical path 900. For example, CAD tools 420 may generate (e.g., allocate, designate, etc.) a candidate location A1 for initially placed functional block A (placed at shaded box A). CAD tools 420 may generate candidate locations B1, B2, B3, B4, B5 for initially placed functional block B (placed at shaded box B) Additionally, functional block B may share candidate locations BC1, BC2, and BC3 with initially placed functional block C (placed at shaded box C). CAD tools 420 may also generate candidate location C1 for functional block C and candidate location CD1 that is shared between initially placed functional blocks C and D (placed at shaded box D). Functional block D may also have candidate location D1 and candidate locations DE1 and DE2 that are shared with initially placed functional block E (placed at shaded box E). Additionally, functional block E may have candidate locations E1, E2, and E3.

Candidate locations of each initially placed functional block may be within a neighborhood designated by CAD tools 420 in FIG. 4. The candidate placement locations may be along the critical path, for example, because candidate locations along the critical path may be more likely to provide shortened critical paths after an updated placement after candidate location moves (e.g., placement into the corresponding candidate locations).

Figure 9C:
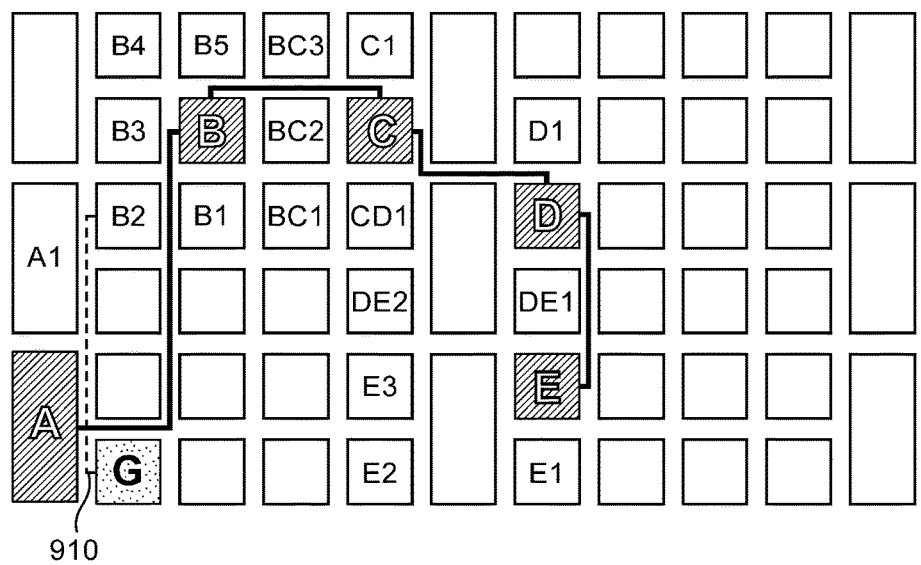

FIG. 9C shows the exemplary circuit design as shown in FIG. 9B and further includes details about the occupancy of functional blocks (sometimes referred to herein as functional cells). Occupancy of a functional block may herein refer to whether or not the hardware resources, onto which the block within the circuit maps, is already used when implemented on PLD 100 in FIG. 1. As shown in FIG. 9C, functional blocks as represented by boxes different sizes may be either shaded or unshaded. Shaded boxes represent functional blocks that are occupied after initial placement (e.g., after placement 512 in FIG. 5). For example, functional block G (sometimes referred to herein as functional block 910) is shaded and may therefore represent a functional block that is occupied. As another example, functional block B1 is unshaded and may therefore represent a functional block that is unoccupied.

When CAD tools 420 in FIG. 4 performs the placement optimization to shorten critical paths, CAD tools 420 may perform critical path and side path length analysis of an updated circuit design to determine improvement. As an example, path length may refer to or be proportional to the delay along the corresponding path. Because the lengths of side paths are also pertinent to determining whether a candidate move is acceptable or qualifies as an improvement, the lengths of side paths may be considered when moving initially placed functional blocks to corresponding candidate locations.

It is important to note that if a candidate location is unoccupied, when analyzing the scenario in which the corresponding functional block is moved to the unoccupied candidate location, no side paths of the former B1 functional block may be changed because candidate location B1 was previously unoccupied (i.e., "empty"). For example, when functional block B is moved to candidate location B1, no further moves need to be made and no side paths coupled to candidate location B1 need to be considered. However, side paths coupled to functional block B prior to the move may still be considered to check criticality constraints of the side paths coupled to functional block B to assess the possibility of the move.

In contrast, when functional block B is moved to candidate location B2, the occupied functional block formerly at location B2 may be moved to the location of shaded box B. In other words, CAD tools 420 may perform a switching operation between the functional blocks at locations B and B2. By also moving the functional block formerly at location B2, the length of side path 910 may also change and be calculated to determine the improvement or feasibility of the swap. As an example, side path 910 may have an unacceptable slack (as set by a constraint) when CAD tools 420 moves the functional block at location B2 to location B. If desired, the constraint may be relaxed to further consider the switch operation, as previously described in FIG. 9A.

Figure 10:
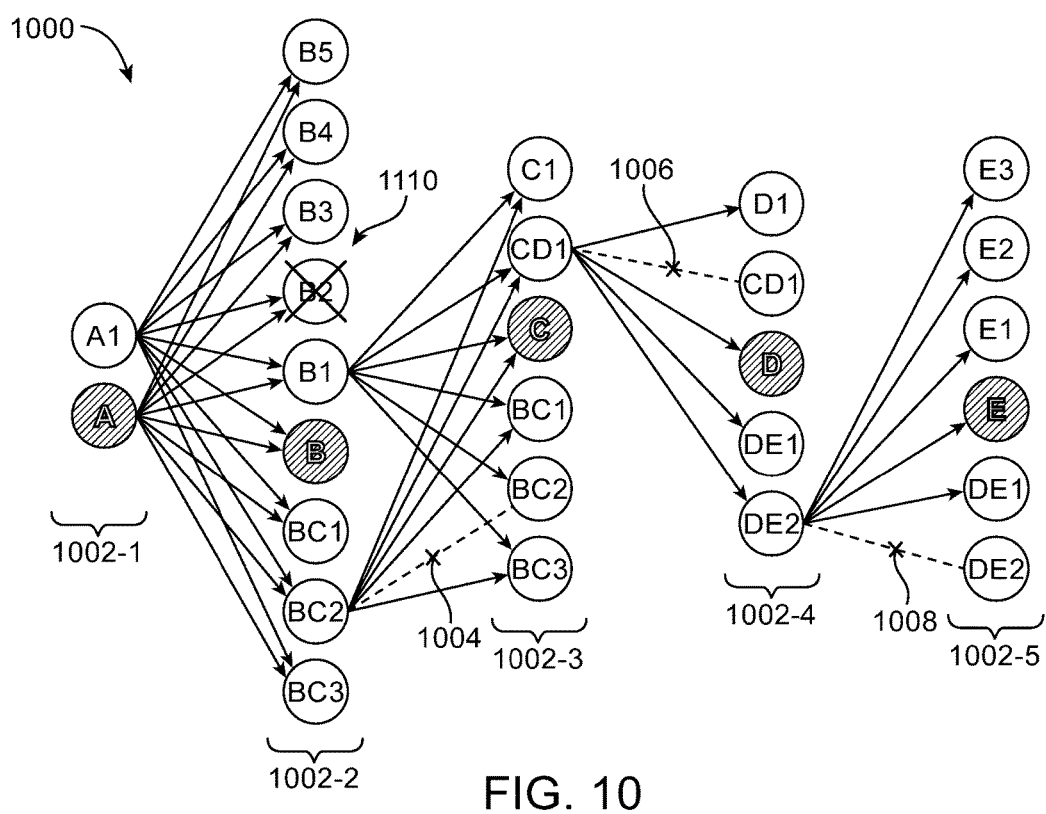
FIG. 10 is a diagram of an illustrative tree structure representing candidate paths between multiple functional blocks along a critical path in accordance with an embodiment.

The consideration of candidate placement locations and the associated path lengths may be depicted in a tree representation. FIG. 10 show a partial tree diagram that represents the circuit design as shown in FIGS. 9A-9C. In particular, tree diagram 1000 (sometimes referred to herein as graph 1000) may include nodes that represent candidate placement locations for the initially placed functional blocks. The candidate locations nodes may have different levels.

For example, first level nodes 1002-1 may include nodes representing candidate locations for functional block A (including the initially placed location for functional block A). Second level nodes 1002-2 may include nodes representing candidate locations for a functional block succeeding functional block A along critical path 900 in FIG. 9 (e.g., candidate locations for functional block B including the initially placed location for functional, block B). Similarly, third level nodes 1002-3, fourth level nodes 1002-4, and fifth level nodes 1002-5 may include corresponding candidate locations for functional blocks C, D, and E, respectively (in succeeding order). A critical path may have a starting point on the first level (e.g., at one of first level nodes 1002-1) and an end point on the fifth level (e.g., at one of fifth level nodes 1002-5). Graph 1000 configured in this way is sometimes referred to as a "levelized" graph.

Edges (or paths) may couple nodes of a given level to nodes of the next level. A length value may be associated with each edge. The length value may represent the length or distance between the two nodes connected by the respective edge. For example, the length value of the A1-B5 edge may be equivalent to the path length (e.g., time or latency) of a signal traveling from functional block A, placed at location A1 to functional block B placed at location B5. Edges may only be present when a path from a legal preceding node to a legal succeeding node includes a legal connection. For example, in a scenario in which the functional block formerly at B2 as shown in FIG. 9C cannot be moved to location B in FIG. 9 (e.g., because of a constraint or hard limit) during the switching operation, node 1110 may represent an illegal node or an illegal candidate location. The illegal node may be removed along with all of its connections (e.g., connections with node A and A1) from tree diagram 1000. Such a trimming/pruning of the tree may help minimize the computation intensity of the placement optimization.

Paths between a node in a preceding level and the same node in a succeeding level may be illegal. For example, path 1004 may not be present in tree diagram 1000 because node BC2 in level 1002-2 cannot be connected to itself in level 1002-3. As described previously, a candidate location that is shared by multiple functional blocks can ultimately only be a placement location for at most one functional block. Therefore, traversing the tree using node BC2 in level 1002-2, which represents placing functional block B at location BC2, removes the possibility of also placing functional block C at location BC2. For similar reasons, paths 1006 and 1008 may be omitted from free diagram 1000.

It is important to note that partial graph 1800 omits some paths that may exist in the full graph to find the shortest path. For example, node B5 may be coupled to some nodes on level 1002-3. These paths are omitted to prevent unnecessarily obscuring the current embodiment.

To shorten or minimize critical path 900 in FIG. 9, CAD tools 420 may traverse tree diagram 100 to find the shortest, path from first, level 1002-1 to fifth level 1002-5. If desired, CAD tools 420 may perform a breadth-first traversal (e.g., a breadth-first search) on tree 1000 while keeping track of the best total path length (e.g., the shortest path length, lowest latency path, etc.) and a preceding node used to obtain the best total path length after each level.

For example, during a breadth-first traversal of second level 1002-2, CAD tools 420 may keep track of a best total path length up to second level 1002-2 by visiting all of the nodes of second level 1002-2 (e.g., by calculating the length up to each node of second level 1002-2). CAD tools 420 may also keep track of the preceding node from first level 1002-1 that generated the best total path length. Levels 1002-3, 1002-4, and 1002-5 may be traversed similarly. At fifth level 1002-5, the overall best path length may be recorded. A final traversal may generate each preceding node that contributed to the overall best path length. The functional blocks may be accordingly placed at the corresponding nodes (e.g., at the corresponding candidate placement locations) to provide a shortened critical path having the overall best path length.

This process may be iteratively performed to continuously shorten the most current (e.g., currently pending) critical path(s). For example, after path 900 in FIG. 9C is shortened using tree 1000 of FIG. 10, CAD tools 420 in FIG. 4 may identify an additional critical path or additional critical paths to be shortened.

Figure 11:
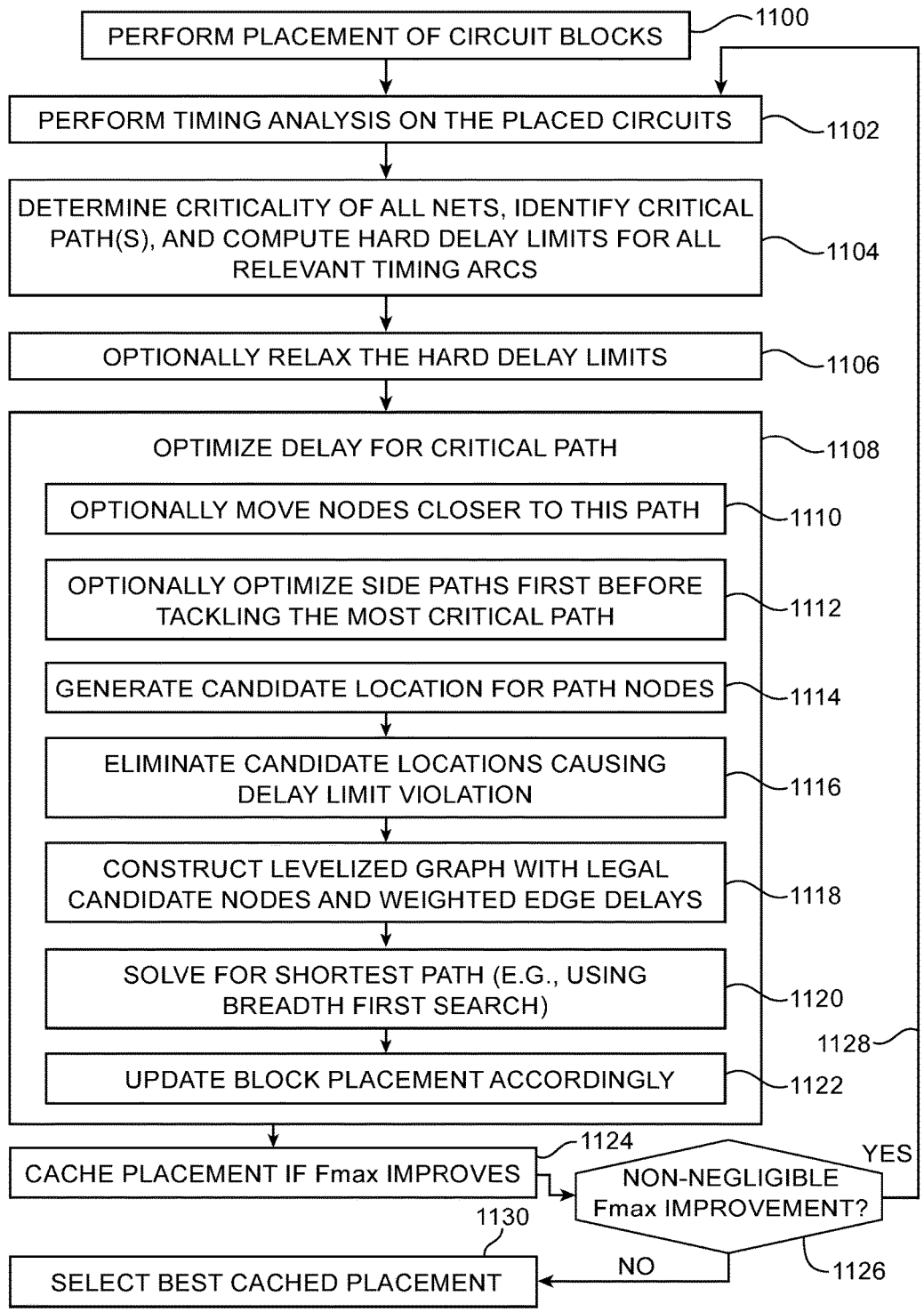
FIG. 11 is a flow chart shoeing illustrative steps that may be performed by a logic design system for reducing latency of a critical path within an integrated circuit in accordance with an embodiment.

FIG. 11 is a flowchart of illustrative steps for using a logic design system (e.g., CAD tools 420 in FIG. 4 to perform placement, optimization of a circuit design based on identified critical paths.

At step 1100, CAD tools 420, in particular placement tools 476 in FIG. 4 may perform placement (e.g., herein defined as initial placement or placement step 512 in FIG. 5) for the circuit design that generates legally placed functional blocks in the circuit design.

At step 1102, CAD tools 420, in particular timing analysis tools, may perform timing analysis on the initially placed circuit design (e.g., initially placed circuits). In other words, the timing analysis tools may determine the delay or latency between any two corresponding functional blocks or for any two-pin net. For example, timing analysis tools may generate the delay or path length of all two-pin nets within the circuit design. As another example, timing tools may generate the delay or path length for only a suitable subset of all two-pin nets or functional block pairs within the circuit design.

At step 1104, CAD tools 420 may determine the criticality of all of the two-pin nets on which the timing analysis was performed. CAD tools 420 may use a criticality threshold value to determine the critical path is) within the circuit design. The criticality threshold value may be pre-selected or user-selected, for example. Hard delay limits (or similarly slack limits, critically limits) may also be placed on all non-critical paths or side paths.

Optionally at step 1106, the hard delay limits may be relaxed (e.g., the hard delay limits may be increased by at least five percent, at least ten percent, or more than 20 percent, etc.) by CAD tools 420 in preparation for step 1108. By relaxing the hard delay limits imposed on the side paths, more candidate location options may be available to shorten the critical path.

At step 1108, CAD tools 420 may optimize (e.g., shorten or ultimately shorten) delay for the critical path. The optimization process may include steps 1114-1122 and optionally, steps 1110 and 1112.

During the optimization process, functional blocks or nodes (e.g., neighboring functional blocks) that are coupled to functional blocks along the critical path may optionally be moved closer to the critical path prior to identifying candidate placement locations at step 1110. Moving neighboring functional blocks closer to the critical path, the flexibility of candidate locations for the functional block along the critical path increases because the movement of the neighboring functional blocks increases the slack of the corresponding side paths (e.g., the side paths coupling the neighboring functional blocks to the functional blocks along the critical path).

During the optimization process, first side paths may optionally be optimized similar to how critical paths are optimized at step 1112. The optimization of side paths also helps increase the slack for the optimized side paths, which increases the flexibility of candidate locations when later optimizing more critical paths.

At step 1114, CAD tools 420 in FIG. 4 may generate candidate locations for critical functional blocks (e.g., functional blocks coupled along the critical path). In the scenario of optimizing a side path (as in step 1112) candidate locations may be generated for functional blocks coupled along the side path. For example, candidate locations, may be generated for critical functional blocks A, B, C, D, and E as described in FIG. 9B.

At step 1116, CAD tools 420 may eliminate any candidate locations that may cause a delay limit violation. For example, node 1110 in FIG. 10 and corresponding candidate location B2 may be removed because a move of critical functional block B to location B2 and a move of functional block in B2 to B's location may cause a delay limit violation on path 910 in FIG. 9.

At step 1118, CAD tools 420 may generate a levelized graph (i.e., a graph with multiple levels such as graph 1000 of FIG. 10) based on the candidate locations, critical functional blocks, side path limitations, and other limitations. The nodes of each level of the levelized graph may represent candidate locations for each respective critical functional block as described in FIG. 10.

At step 1110, CAD tools 420 may traverse the levelized graph to solve for the shortest overall path. For example, graph 1000 may be traversed using breadth-first search to solve for the shorted path from first level 1002-1 to fifth level 1002-5.

After traversal using breadth-first search, CAD tools 420 may also keep track of the nodes that make up the shortest overall path. The critical functional blocks may be placed at the candidate locations corresponding to the nodes that make up the shortest overall path at step 1122. Any switching operations, as described in FIG. 9C may also occur as a consequence of the updated placement.

If maximum operating frequency Fmax (e.g., determined based on the delay of the most critical path) of the circuit design improves, the updated placement of the circuit is cached at step 1124.

To determine whether subsequent iterations are necessary, the improvement of maximum operating frequency Fmax based on the updated placement may be compared to a standard value at step 1126. If the improvement is greater than the standard value, the improvement to maximum operating frequency Fmax may be non-negligible. Therefore, improvements in subsequent iterations may be possible. The updated placement is provided to step 1102 using path 1128 for the next iteration. If the improvement is less than the standard value, the improvement to maximum operating frequency Fmax may be negligible. Therefore, CAD tools may proceed to step 1130, during which the best cached placement is selected in implemented by the functional blocks within the circuit design.

By performing placement optimization in this way, placement optimization may be customized for different applications within logic design (e.g., shortening side-paths, shortening critical paths, iteratively shortening any suitable paths, incrementally increasing the maximum operating frequency, etc.). Placement optimization can be made to the logic design in a resource-efficient and timing-optimized manner as the design is physically synthesized, with increased versatility to meet legality specifications for the entire design. In other words, system 156 may identify multiple functional blocks and improve the global operating frequency of the circuit design by iteratively decreasing the delay between the multiple functional blocks.

The method and apparatus described herein may be incorporated into any suitable electronic device or system of electronic devices. For example, the method and apparatus may be incorporated into numerous types of devices such as microprocessors or other ICs. Exemplary ICs include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), digital signal processors (DSPs), graphics processing units (CPUs) just to name a few.

The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

The integrated circuit described herein may be part of a data processing system that includes one or more of the following components a processor memory I/O circuitry and peripheral devices. The integrated circuit, can be used in a wide variety of applications, such as computer networking, data networking, instrumentation, video processing, digital signal processing, or any suitable other application where the advantage of using interconnection circuits that provide reset value holding capabilities is desirable.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit, of the invention.

What is claimed is:

1. A method of operating design tools running on a logic design system to implement a circuit design, the method comprising:
    with the logic design system, placing a plurality of functional blocks in the circuit design;
    with the logic design system, identifying a critical path linking the plurality of functional blocks;
    with the logic design system, identifying candidate placement locations for each of the plurality of functional blocks in the critical path;
    with the logic design system, generating a levelized graph that represents possible paths linking the candidate placement locations for a first functional block in the plurality of functional blocks to the candidate placement locations for a second functional block in the plurality of functional blocks;
    with the logic design system, analyzing the levelized graph to identify an updated critical path;
    with the logic design system, moving the first functional block to one of its candidate placement locations to implement the updated critical path; and
    configuring an integrated circuit at least partially based on the updated critical path.

2. The method of claim 1, further comprising:
    updating the placement of the plurality of functional blocks according to the updated critical path.

3. The method of claim 2, further comprising:
    determining whether the updated critical path improves the performance of the circuit design; and
    in response to determining that the updated critical path improves the performance of the circuit design, caching the updated placement of the plurality of functional blocks.

4. The method of claim 3, further comprising:
    in response to determining that the updated critical path improves the performance of the circuit design, identifying a new critical path in the circuit design.

5. The method of claim 1, wherein identifying the critical path linking the plurality of functional blocks comprises evaluating an amount of delay slack for each interconnection in the circuit design, and wherein the critical path linking the plurality of functional blocks exhibits a cumulative amount of delay slack that is below a predetermined threshold.

6. The method of claim 1, further comprising:
    computing hard delay limits for side paths that are connected to the plurality of functional blocks.

7. The method of claim 6, further comprising:
    relaxing the computed hard delay limits to increase a number of the candidate placement locations.

8. A method of operating design tools running on a logic design system to implement a circuit design, the method comprising:
    with the logic design system, placing a plurality of functional blocks in the circuit design;
    with the logic design system, identifying a critical path linking the plurality of functional blocks;
    with the logic design system, identifying candidate placement locations for each of the plurality of functional blocks in the critical path;
    with the logic design system, generating a levelized graph that represents possible paths linking the candidate placement locations for a first functional block in the plurality of functional blocks to the candidate placement locations for a second functional block in the plurality of functional blocks;
    with the logic design system, identifying a shortened critical path within the levelized graph by solving a shortest path problem associated with the levelized graph;

with the logic design system, moving the first functional block to one of its candidate placement locations based on the shortened critical path; and configuring an integrated circuit using the circuit design obtained at least partially via solving the shortest path problem.

9. The method of claim 8, further comprising:

moving an additional functional block that is directly connected to a given one of the plurality of functional blocks closer to the given one of plurality of functional blocks to increase a number of the candidate placement locations for the given one of the plurality of functional blocks.

10. The method of claim 8, wherein a first additional functional block is located at one of the candidate placement locations for a given one of the plurality of functional blocks, and wherein a second additional functional block is directly connected to the first additional functional block, the method further comprising:

moving the second additional functional block closer to the first additional functional block to increase a number of the candidate placement locations for the given one of the plurality of functional blocks.

11. The method of claim 8, further comprising:

computing a hard delay limit for a side path that is connected to an additional functional block that is located in a given one of the candidate placement locations.

12. The method of claim 11, further comprising:

eliminating the given one of the candidate placement locations if moving the additional functional block violates the computed hard delay limit.

13. The method of claim 8, wherein the levelized graph includes a plurality of levels each corresponding to a respective one of the plurality of functional blocks, wherein a first level in the plurality of levels includes the identified candidate placement locations for the first functional block in the plurality of functional blocks, and wherein a second level in the plurality of levels includes the identified candidate placement locations for the second functional block in the plurality of functional blocks, the method further comprising:

eliminating a path in the levelized graph connecting a given candidate placement location in the first level to the given candidate placement location in the second level.

14. The method of claim 8, wherein:

the levelized graph includes a plurality of levels each corresponding to a respective one of the plurality of functional blocks;

a first level in the plurality of levels includes the identified candidate placement locations for the first functional block in the plurality of functional blocks;

a second level in the plurality of levels includes the identified candidate placement locations for the second functional block in the plurality of functional blocks;

the critical path has a starting point in the first level and has an end point in the second level; and identifying the shortened critical path within the levelized graph comprises solving for a shortest path linking the first level to the second level.

15. The method of claim 14, wherein solving for the shortest path linking the first level to the second level comprises performing a breadth-first search.

* * * * *